United States Patent
Aidan et al.

(10) Patent No.: US 12,456,537 B2
(45) Date of Patent: Oct. 28, 2025

(54) EXTENDING DUAL INLINE MEMORY MODULE (DIMM) LIFESPANS BASED ON FAULT CHARACTERIZATION AND OPTIMIZED CORRECTIVE ACTION

(71) Applicant: Google LLC, Mountain View, CA (US)

(72) Inventors: Fabrice Aidan, Ramat HaSharon (IL); Evgeni Krimer, Haifa (IL)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 18/200,322

(22) Filed: May 22, 2023

(65) Prior Publication Data

US 2024/0395350 A1  Nov. 28, 2024

(51) Int. Cl.
G11C 29/52 (2006.01)
G11C 29/00 (2006.01)

(52) U.S. Cl.
CPC ............ *G11C 29/52* (2013.01); *G11C 29/783* (2013.01)

(58) Field of Classification Search
CPC .............................. G11C 29/52; G11C 29/783
See application file for complete search history.

(56) References Cited

U.S. PATENT DOCUMENTS

| | | |
|---|---|---|
| 4,209,846 A | 6/1980 | Seppa |
| 4,255,808 A | 3/1981 | Schaber |
| 6,519,736 B1 | 2/2003 | Chen et al. |
| 7,971,112 B2 | 6/2011 | Murata |
| 2006/0112306 A1 | 5/2006 | Chessin et al. |
| 2008/0010566 A1 | 1/2008 | Chang et al. |
| 2008/0301529 A1 * | 12/2008 | Spanel ................ G06F 11/1012 714/E11.055 |
| 2009/0150721 A1 * | 6/2009 | Kochar ............... G06F 11/1666 714/6.11 |
| 2010/0185897 A1 | 7/2010 | Abts et al. |
| 2012/0079351 A1 | 3/2012 | Cideciyan et al. |
| 2013/0191701 A1 * | 7/2013 | Mueller .............. G06F 11/1048 714/764 |
| 2015/0067444 A1 | 3/2015 | Eguchi et al. |
| 2015/0089164 A1 | 3/2015 | Ware et al. |
| 2016/0284424 A1 | 9/2016 | Das et al. |
| 2017/0123879 A1 | 5/2017 | Donlin |

(Continued)

FOREIGN PATENT DOCUMENTS

| | | |
|---|---|---|
| CN | 102681930 A | 9/2012 |
| JP | H0816483 A | 1/1996 |

(Continued)

OTHER PUBLICATIONS

Kim et al., "Bamboo ECC: Strong, Safe, and Flexible Codes for Reliable Computer Memory," 2015 IEEE 21st International Symposium on High Performance Computer Architecture (HPCA), Burlingame, CA, USA, 2015. 12 pages.

(Continued)

*Primary Examiner* — Min Huang
(74) *Attorney, Agent, or Firm* — Lerner David LLP

(57) ABSTRACT

Aspects of the disclosed technology include techniques and mechanisms for extending DIMM lifespans based on fault characterization and optimized corrective action. An error may be detected as a result of a read transaction. The detected error may be analyzed further to generate a fault profile, wherein the fault profile may indicate spatial characteristics of the detected error.

23 Claims, 6 Drawing Sheets

(56) References Cited

U.S. PATENT DOCUMENTS

| | | | |
|---|---|---|---|
| 2017/0269979 A1 | 9/2017 | Gollub et al. | |
| 2018/0046541 A1* | 2/2018 | Niu | G06F 11/1048 |
| 2019/0088349 A1 | 3/2019 | Pyo et al. | |
| 2019/0179704 A1* | 6/2019 | Niu | G11C 5/04 |
| 2023/0063804 A1 | 3/2023 | Kim | |
| 2024/0061741 A1* | 2/2024 | Agarwal | G11C 29/52 |
| 2024/0330108 A1* | 10/2024 | Aidan | G06F 11/1044 |

FOREIGN PATENT DOCUMENTS

| | | |
|---|---|---|
| WO | 2022116706 A1 | 6/2022 |
| WO | 2022139849 A1 | 6/2022 |

OTHER PUBLICATIONS

Kim and Erez, "Balancing Reliability, Cost, and Performance Tradeoffs with FreeFault," 2015 IEEE 21st International Symposium on High Performance Computer Architecture (HPCA), Burlingame, CA, USA, 2015. 13 pages.

Lavery, "Discriminating Between Soft Errors and Hard Errors in RAM," Application Report SPNA109, Texas Instruments, Jul. 2008. 5 pages.

Li et al., "From Correctable Memory Errors to Uncorrectable Memory Errors: What Error Bits Tell," The International Conference for High Performance Computing, Networking, Storage, and Analysis (SC22), Dallas, TX, USA, 2022. 14 pages.

Li et al., "Short Paper: a Memory Soft Error Measurement on Production Systems," 2007 USENIX Annual Technical Conference (USENIX ATC 07), Santa Clara, CA, USA, 2007, pp. 275-280.

International Search Report and Written Opinion for International Application No. PCT/US2024/019707 dated Jun. 17, 2024. 11 pages.

Extended European Search Report for European Patent Application No. 23194720.1 dated Jan. 31, 2024. 7 pages.

Extended European Search Report for European Patent Application No. 23216912.8 dated May 16, 2024. 11 pages.

Office Action for Chinese Patent Application No. 202311237975.1 dated Apr. 20, 2025. 8 pages.

* cited by examiner

EXTENDING DUAL INLINE MEMORY MODULE (DIMM) LIFESPANS BASED ON FAULT CHARACTERIZATION AND OPTIMIZED CORRECTIVE ACTION

BACKGROUND

Cloud computing, more generally client-server computing, has become a mainstay for many business enterprises as it provides what some consider to be essential computing services offered via the cloud (e.g., a network of servers, storage, databases, software, and other equipment and services made available by cloud platform providers) that result in operational and cost advantages. Cloud services (e.g., SaaS, PaaS, IaaS) are typically provided via data centers located at different geographic locations. Each data center usually houses various computing resources and other network equipment that receive, process, and/or store voluminous amounts of data arriving at the data center and transmit processed data to other data centers or end user devices (e.g., servers, personal computers, cellular devices, or, more generally, client devices).

Dynamic random access memory (DRAM) devices are generally considered critical to the functionality of data centers, but, over time, a DRAM device may be susceptible to memory errors caused by faults (e.g., a hardware defect), which may cause the DRAM device to experience performance issues. For example, DRAM device faults may have a negative effect on the performance of services offered via data centers. Depending on the type of fault, the DRAM device may be salvaged, thereby allowing for its continued use in a dual inline memory module (DIMM) (e.g., DDR5 DIMM, or the like), which may include a plurality of DRAM devices including the impacted DRAM device.

Errors may signal an incorrect (or malfunctioning) memory state and faults may indicate the underlying cause of the error. Errors may be either correctable errors (CE) or uncorrectable errors (UE). A CE may be detected and corrected using Error Correction Code (ECC) symbols, e.g., Reed-Solomon (RS) codes, array codes, or the like, stored within a different DRAM device from the DRAM device used to store data symbols. ECCs may be added to the DRAM by a memory controller. ECC symbols are typically used to correct memory errors caused by faulty I/O data pins (DQs). Alternatively, a UE may be detected, but might not be corrected. An error may be uncorrectable when the ECC symbols are insufficient to correct the number of errors detected (e.g., when the number of detected errors exceeds the number of ECC symbols).

The number of bits used to form an ECC may impact the capacity of the code to detect and correct multiple errors. The number of bits used to form an ECC can also affect how much memory is dedicated to error checking in the DRAM, since additional storage capacity may be required of the DRAM to store the ECC. If the number of bits impacted by errors is beyond the limit of the ECC's correction capability, the error is typically uncorrectable, resulting in a system shutdown or crash. If the detected errors are correctable using the ECC, the data can be corrected, allowing the system to continue performing its tasks.

For each detected error, a fault profile may consist of a spatial characterization of the error. In this regard, a temporal characteristic of an error may indicate that the error is one of a transient, intermittent, or permanent error. A transient error may be a one-off error that is expected during normal (or expected) operations of a DRAM device, where transient errors may include a hardware glitch, static shock, poor hardware settings, poor hardware quality, or the like. Expected operations of the DRAM device may include read transactions, write transactions, transmitting data through a data bus, searching for data in a DRAM device memory location, or the like. Transient errors typically do not indicate hardware damage. Transient errors may occur more infrequently (e.g., once) within some predetermined time period or predetermined number of memory transactions than intermittent errors (e.g., multiple times). An intermittent error may repeatedly occur in the same location (e.g., a particular DRAM memory address). A permanent error may occur in the same location (e.g., the particular DRAM memory address) each time the location is accessed.

Transient or intermittent errors may be logged by the memory system (e.g., the memory controller). Permanent errors, on the other hand, may require replacement of the DRAM device and/or DIMM. In addition, with aging, a DRAM device may reach a point where four or more data symbols exhibit permanent errors, which can require replacement of the DIMM with the faulty device. Damaged hardware may initially exhibit one or more intermittent CEs, which, with time, may become permanent CEs, and finally, if an additional hardware fault appears, may lead to permanent UEs.

SUMMARY

Aspects of the disclosed technology may comprise a process, apparatus or system for extending DIMM lifespans based on fault characterization and optimized corrective action. An error may be detected as a result of a first read transaction. The detected error may be identified as one of a CE or an UE. If after the first read transaction, the detected error is an UE, then additional read transactions may be executed. If, after the additional read transactions, the detected error is determined to still be an UE, then the detected UE may be flagged for manual inspection.

Alternatively, if, after the first read transaction, the detected error is a CE, then the detected CE may be corrected using the ECC symbols stored on a corresponding DRAM device. The detected CE may be further analyzed to determine a temporal characteristic of the detected CE. The temporal characteristic may indicate that the detected CE is one of a transient, intermittent, or permanent error. The temporal characteristic of the detected CE may be used to generate a fault profile that may indicate a spatial characteristic of the detected CE. The spatial characteristic of the detected CE may correspond to corrective action that may be executed to correct the CE.

One aspect of the disclosure provides a method for extending a lifespan of a dual in-line memory module (DIMM) comprising: detecting an error associated with a first data read from a memory address of a dynamic random access memory (DRAM) device as a result of a read transaction; determining whether the detected error is a correctable error; based on determining the detected error is correctable, determining a temporal characteristic of the detected error; generating, based on the temporal characteristic indicating that the detected error is an intermittent error or a permanent error, a fault profile that corresponds to the detected error, wherein the fault profile comprises a spatial characteristic of the detected error, wherein the spatial characteristic indicates memory locations within the DIMM that are affected by the detected error, and wherein the spatial characteristic corresponds to corrective action that is used to correct the detected error; and correcting the detected error based on the corrective action indicated in the fault profile.

According to some examples, determining whether the detected error is the correctable error is based on determining a number of detected errors is equal to or less than a number of error correction code (ECC) symbols stored in the DRAM device.

In the foregoing embodiments, the method further comprises determining the detected error is an uncorrectable error based on a number of detected errors exceeding a number of ECC symbols stored in the DRAM device.

According to some examples, the temporal characteristic of the detected error indicates that the detected error is a transient error, the intermittent error, or the permanent error, and wherein: the transient error occurs during expected operations of the DRAM device, the intermittent error occurs in a specific DRAM device memory location, and the permanent error occurs in the specific DRAM device memory location every time the specific DRAM device memory is accessed.

According to some examples, determining the spatial characteristic of the detected error is based on determining that the detected error is the intermittent error or the permanent error, and wherein the spatial characteristic of the detected error indicates a number of data pins (DQs) within the DRAM device that are affected by the detected error.

According to some examples, the DRAM device comprises independently-controlled data banks, wherein each data bank comprises a subarray of data, and wherein the subarray comprises rows and columns of data stored in the DRAM device.

According to some examples, generating the fault profile further comprises, based on determining the detected error is the intermittent error or the permanent error and based on determining the detected error affects a single data pin, re-executing the read transaction in one of: a different column and a different row than the column and row where the initial read transaction occurred, the different column and the row where the initial read transaction occurred, or the different row and the column where the initial read transaction occurred.

In the foregoing embodiments, the method further comprises, based on determining the detected error occurs in the different column and the different row than the column and row where the initial read transaction occurred, identifying the detected error as a single data pin error and correcting the single data pin error using ECC symbols stored in the DRAM device. In the foregoing embodiments, the method further comprises, based on determining the detected error occurs in the different column and the row where the initial read transaction occurred, identifying the detected error as a partial row error and correcting the partial row error using at least one fast post package repair (sPPR) command. In the foregoing embodiments, the method further comprises, based on determining the detected error occurs in the different row and the column where the initial read transaction occurred, identifying the detected error as a column error and correcting the column error using ECC symbols stored in the DRAM device.

In some examples, generating the fault profile further comprises, based on determining the detected error is one of the intermittent error or the permanent error and based on determining the detected error affects more than one data pin (DQ), re-executing the transaction in one of: a different bank and a different row than the bank and row where the initial read transaction occurred, or the different row and the bank where the initial read transaction occurred.

In the foregoing embodiments, the method further comprises, based on determining the detected error occurs in the different bank and the different row than the bank and row where the initial read transaction occurred, identifying the detected error as a full device error and correcting the full device error using erasure code. In the foregoing embodiments, the method further comprises, based on determining the detected error occurs in the different row and the bank where the initial read transaction occurred, identifying the detected error as a bank error and correcting the bank error using erasure code. In the foregoing embodiments, the method further comprises, based on determining the detected error occurs elsewhere, identifying the detected error as a raw error and correcting the raw error using at least one fast post package repair (sPPR) command.

Another aspect of the disclosure provides an apparatus comprising: an interface for communicating with one or more memory devices; a memory controller, the memory controller having logic that causes the memory controller to: detect an error associated with a first data read from a memory address of a dynamic random access memory (DRAM) device as a result of a read transaction; determine whether the error detected as a result of the read transaction is a correctable error; based on determining the error detected as a result of the read transaction is correctable, determine temporal characteristics of the detected error and spatial characteristics of the detected error; and correct the detected error based on the spatial characteristics of the detected error.

In some examples, the logic comprises hardware logic, and wherein the logic is implemented in an application-specific integrated circuit (ASIC).

In some examples, the temporal characteristic of the detected error indicates that the detected error is a transient error, an intermittent error, or a permanent error, and wherein: the transient error occurs during expected operations of the DRAM device, the intermittent error occurs in a specific DRAM device memory location, and the permanent error occurs in the specific DRAM device memory location every time the specific DRAM device memory is accessed.

In some examples, the DRAM device comprises independently-controlled data banks, wherein each data bank comprises a subarray of data, and wherein the subarray comprises rows and columns of data stored in the DRAM device.

In the foregoing embodiments, the logic further causes the memory controller to, based on determining the detected error is an intermittent error or a permanent error and based on determining the detected error affects a single data pin, re-execute the read transaction in one of: a different column and a different row than the column and row where the initial read transaction occurred, the different column and the row where the initial read transaction occurred, or the different row and the column where the initial read transaction occurred. In the foregoing embodiments, the logic further causes the memory controller to, based on determining the detected error occurs in the different column and the different row than the column and row where the initial read transaction occurred, identify the detected error as a single data pin error and correcting the single data pin error using ECC symbols stored in the DRAM device. In the foregoing embodiments, the logic further causes the memory controller to, based on determining the detected error occurs in the different column and the row where the initial read transaction occurred, identify the detected error as a partial row error and correcting the partial row error using at least one fast post package repair (sPPR) command. In the foregoing embodiments, the logic further causes the memory controller to, based on determining the detected error occurs in the different row and the column where the initial read transaction occurred, identify the detected error as a column error and correcting the column error using ECC symbols stored in the DRAM device.

In the foregoing embodiments, the logic further causes the memory controller to, based on determining the detected error is an intermittent error or a permanent error and based on determining the detected error affects more than one data pin (DQ), re-execute the transaction in one of: a different bank and a different row than the bank and row where the initial read transaction occurred, or the different row and the bank where the initial read transaction occurred.

In the foregoing embodiments, the logic further causes the memory controller to, based on determining the detected error occurs in the different bank and the different row than the bank and row where the initial read transaction occurred, identify the detected error as a full device error and correcting the full device error using erasure code. In the foregoing embodiments, the logic further causes the memory controller to, based on determining the detected error occurs in the different row and the bank where the initial read transaction occurred, identify the detected error as a bank error and correcting the bank error using erasure code. In the foregoing embodiments, the logic further causes the memory controller to, based on determining the detected error occurs elsewhere, identify the detected error as a raw error and correcting the raw error using at least one fast post package repair (sPPR) command.

Another aspect of the disclosure provides a system comprising: a dual in-line memory module (DIMM) comprising a plurality of DRAM devices; a memory controller configured to communicate with the plurality of DRAM devices and having logic that causes the memory controller to: detect an error associated with a first data read from a memory address of a dynamic random access memory (DRAM) device as a result of a read transaction; determine whether the error detected as a result of the read transaction is a correctable error; based on determining the error detected as a result of the read transaction is correctable, determine temporal characteristics of the detected error and spatial characteristics of the detected error; and correct the detected error based on the spatial characteristics of the detected error.

DETAILED DESCRIPTION

Figure 1A:
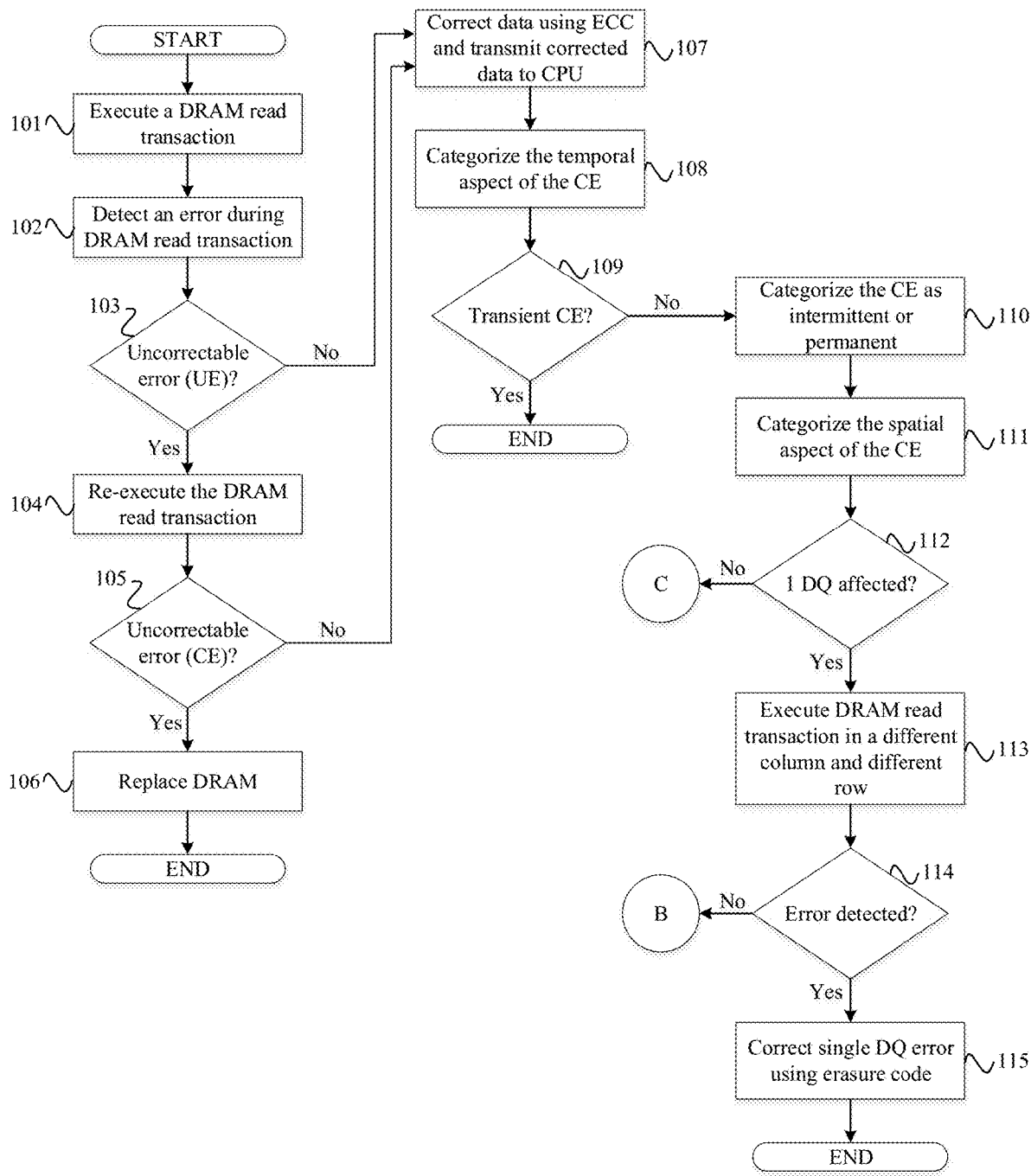
FIGS. 1A-1C illustrate an example process for extending DIMM lifespans based on fault characterization and optimized corrective action, in accordance with an aspect of the disclosed technology.

Aspects of the disclosed technology include processes, systems, devices, and mechanisms for extending DIMM lifespans based on fault characterization and optimized corrective action. For example, an application-specific integrated circuit (ASIC) may be configured to generate a fault profile comprising a spatial characterization of a detected error. In addition, a temporal nature of the error may indicate whether it is transient, intermittent, or permanent. Additionally, the spatial nature of the error may indicate a number of data pins (DQs) affected by the error. A DQ is an output pin of a DRAM device which drives data upon request.

In explaining aspects of the disclosed technology, it is assumed that the memory devices (e.g., DDR5 DRAM devices) make use of the DDR5 standard or architecture, though the disclosed technology can be used with other standards (e.g., DDR4, HBM, etc.). DDR5 DRAM devices used in server applications typically have 4 or 8 DQs. Each DRAM device is assumed herein to include 4 DQs, although in some examples a DRAM device can have more or fewer DQs.

A burst access to such a DRAM device is assumed to include 16 beats and data is transferred in 64 byte data blocks. The burst access refers to high-speed data transmission, which may include writing data to a memory location or reading data from a memory location. During the burst access, the system requesting data from the memory location or writing data to the memory location may be the only system with access to the data bus through which the data flows so that other systems do not interrupt the read or write transaction. Each beat of the burst access refers to a different read or write transaction executed on the memory location. Therefore, each burst access may include a total of 16 read or write transactions. Each read or write transaction may transmit 64 bytes of data.

A typical DDR5 server configuration is the 10x4 configuration (e.g., 10 DRAM devices each having 4 DQs). Upon request (e.g., by a CPU of a system requesting access to a particular DRAM device memory address), 4 DQs will drive a four-bit data bus 16 times (1 bit per DQ for each of 16 beats) resulting in 64 bits or 8 bytes for each DRAM device. For 10 devices, a burst access results in 640 bits or 80 bytes of data. In some examples, 64 bytes (8 DRAMs) are used for data symbols and 16 bytes (2 DRAMs) are used for ECC symbols.

Depending on the nature of the error detected (e.g., transient or intermittent errors, permanent errors, single address errors, or single DQ errors), certain actions may be taken to avoid having to replace the entire DIMM that is the source of the error. For example, if a UE is determined to be permanent but only impacting a single address, that address may be remapped (e.g., into the Last Level Cache (LLC) memory) or other measures may need to be taken to avoid having that address used going forward. Alternatively, if a UE is determined to be permanent and impacts multiple addresses (e.g., a single DQ), the impacted DRAM may be replaced in the DIMM. Further, if a UE is determined to be permanent and the location of the error is known, the ECC may be adapted using erasure code capability of the coding scheme (e.g., Reed Solomon (RS) scheme) to correct the errors.

Reed Solomon (RS) is a coding scheme often used with DRAMs to mitigate against errored data. The example RS scheme described herein is assumed to include 32 data symbols, 8 ECC symbols, and 16 bits per symbol, although in other examples, RS schemes with different parameters for the number of data symbols, ECC symbols, or bits per symbol, are used. The nomenclature for describing this RS scheme is RS (40, 32, 16). The number of ECC symbols, in this case 8, is usually identified using the acronym nECC. An RS (40, 32, 16) scheme can detect and correct up to nECC/2 erroneous symbols (e.g., in the example scheme nECC/2=8/2=4 erroneous symbols) assuming the location of the erroneous symbols are unknown. In a case where the locations of the erroneous symbols are known or can be determined, the scheme can detect and correct up to nECC erroneous symbols (e.g., can detect and correct up to 8 erroneous symbols in our example scheme), which is often referred to as "erasure code" capability. The RS (40, 32, 16) scheme can also handle combinations of known and unknown error locations. Specifically, assuming k known errors, k ECC bits are used to correct these known location errors, leaving the code with the capacity to detect and correct up to (nECC−k)/2 erroneous symbols at unknown locations. Erroneous symbols at unknown locations are also referred to as random errors.

An understanding of DIMM and DRAM device architecture is important to understand the method of characterizing faults discussed below. A DIMM comprises a plurality of DRAM devices that work together to supply a cache line of data to a CPU. A single DIMM is referred to as a rank. Each DRAM device on the DIMM is comprised of independently-controlled banks (e.g., data banks). The banks share the DQs of the DRAM device and each bank is comprised of a subarray of data (e.g., a DRAM memory matrix). Each subarray comprises rows and columns, which provide memory addresses to which the CPU may write data and from which the CPU may read data. The columns and rows of the subarray may include data that is stored in memory locations of the DRAM device.

In some instances, an error may affect a single DQ. The most common spatial characteristics of an error that affects a single DQ may indicate that the error is one of a single column, a partial row error, or a single DQ error. The single column error may affect a single column, but may span multiple rows. The partial row error may affect between 2 and 128 columns in a single row. A single pin error may occur across every rank on the single DQ.

In some instances, the error may impact more than one DQ (e.g., 4 DQs). The most common spatial characteristics of an error that affects more than one DQ may indicate that the error is one of a single row error, a single bank error, or a full device error. The single row error may affect all or most of the columns in a row. The single bank error may affect all or most of the rows in a bank. The full device error may affect between 9 and 16 banks in a DRAM device.

Each fault profile may have corresponding corrective action. The methods or processes described herein categorize detected errors (e.g., using a hardware component such as an ASIC residing in a memory controller and having logic that executes the method described herein) and identifies the corresponding corrective action that may be executed to remedy the error and expand the lifespan of the faulty DRAM device and corresponding DIMM.

The foregoing aspects of this technology offer an addition to current DRAM device architecture that categorizes detected errors and optimizes corresponding corrective action to remedy detected CE and extend the lifespan of DIMMs and the DRAM devices therein. The technology may take the form of one or more hardware components that may be added to current DRAM devices (e.g., ASIC components).

Figure 1B:
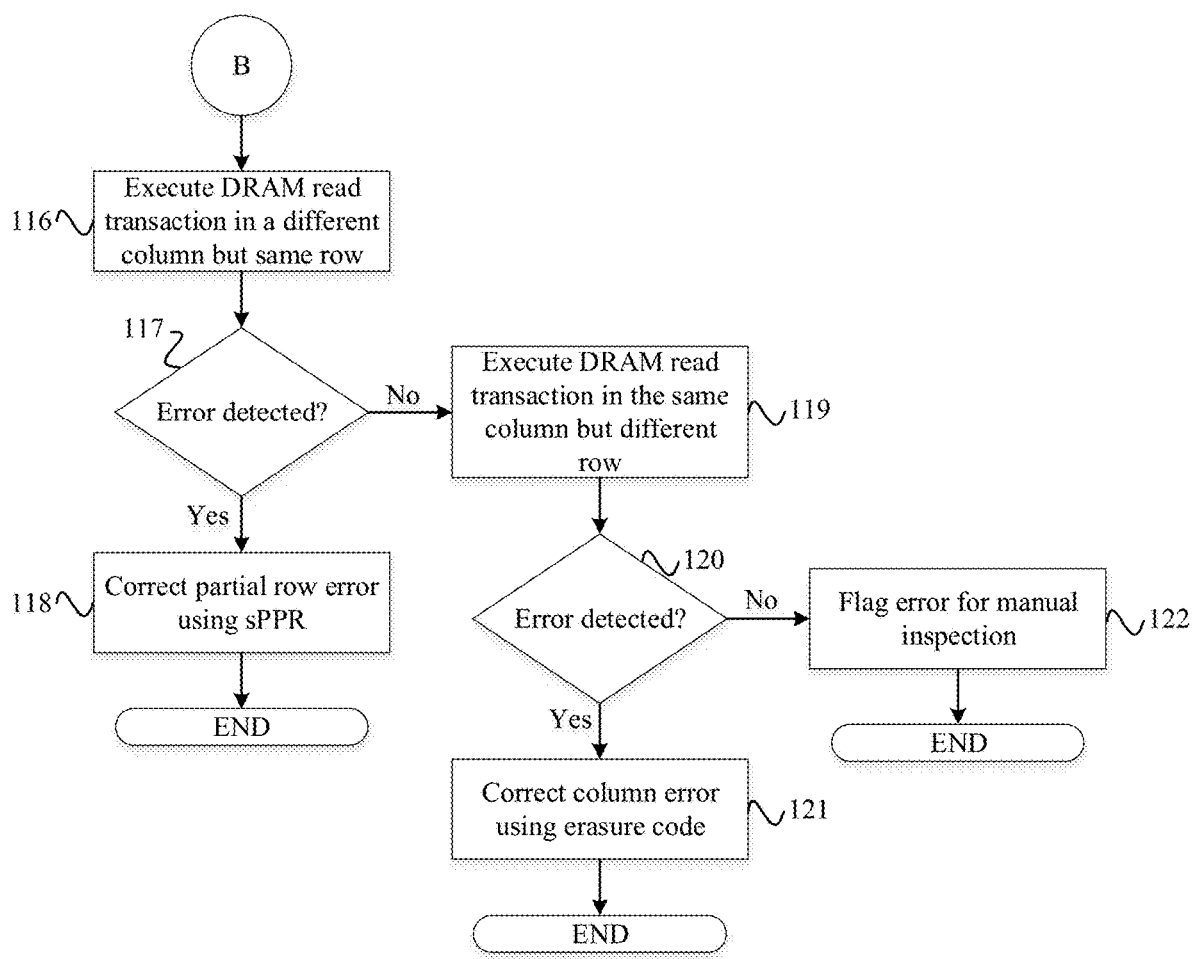
Figure 1C:
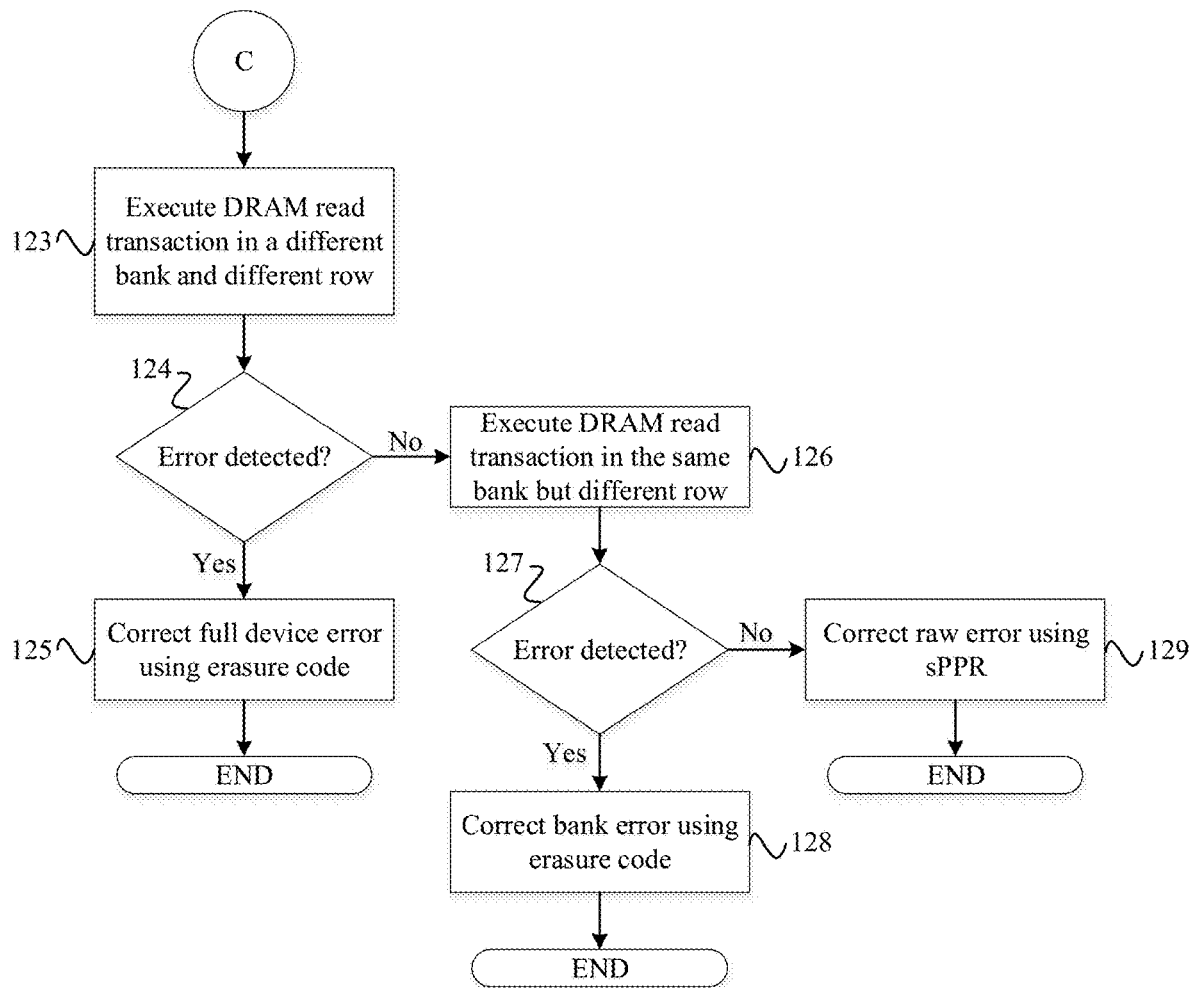

FIGS. 1A-1C illustrate a process or method for extending DIMM lifespans based on fault characterization and optimized corrective action, in accordance with an aspect of the disclosed technology. The steps described herein may be performed by one or more hardware components that may be added to current memory controllers, DRAM devices, or DIMMs (e.g., application specific integrated circuits (ASICs)). The steps described herein are presented in the current order by way of example and the order of steps are not meant to be limiting.

Referring to FIG. 1A, at step 101, a read transaction (e.g., an initial read transaction, a first read transaction) may be executed upon a memory address within a DRAM device located on a DIMM. In some instances, an ASIC may be configured to execute the initial read transaction. The initial read transaction may be the result of the CPU requesting access to data stored in the memory address. The data stored in the memory address may be retrieved and returned along with the ECC symbols stored along with the data written as part of a previous write transaction. Such read requests may be processed through a memory controller. In some instances, the ASIC may be configured to retrieve and return the requested data as well as the ECC symbols.

At step 102, at least one error may be detected as a result of the read transaction. In some instances, the ASIC may be configured to detect errors as a result of the initial read transaction.

At step 103, processing proceeds to determine whether the detected error is correctable or uncorrectable. In some instances, the ASIC may be configured to determine whether the detected error is a CE or an UE. A CE is an error that the ECC may be capable of detecting and correcting. A UE is an error that the ECC may be able to detect, but might not be able to correct. If no error is detected, processing may proceed normally, with the data being provided to the requesting entity (e.g., the CPU, host, user plane). In some instances, the ASIC may be configured transmit the requested data to the requesting entity based on determining that no error was detected.

If, at step 103, it is determined that the detected error is a UE, then, at step 104, a subsequent (e.g., second) read transaction may be executed upon the memory address. In some instances, the ASIC may be configured to execute a subsequent read transaction on the memory address based on determining the detected error is an UE. A retry mechanism may be invoked and may repeat and/or resend the same read transaction that initiated the process in step 101 a predetermined number of times. The predetermined number of times may include multiple times (e.g., more than one time and typically between 4 and 8 times), and may be configurable.

At step 105, it may be determined whether an error (e.g., the UE) was detected as a result of the repeated read transactions. In some instances, the ASIC may be configured to determine whether an error was detected as a result of the repeated read transactions.

If, at step 105, it is determined that an error (e.g., the same UE detected in step 103) was detected again, then, at step 106, the DRAM device associated with the memory address called during the read transaction(s) may be flagged for manual intervention. In some instances, the ASIC may be configured to flag the DRAM device based on determining that the detected error is the same error detected as a result of the first read transaction. If, after multiple retries/rereads, the read transaction still includes the UE, this may indicate a permanent error requiring retirement and, ultimately, replacement of the DRAM or other measures that may avoid accessing the affected memory region or DRAM device.

However, if, at either or steps 103 or 105, it is determined that the detected error is a CE, then, at step 107, the CE may be corrected using the ECC symbols stored on the DIMM associated with the memory address upon which the read transaction(s) were executed. The data read from the memory address may be transmitted to a requestor (e.g., the CPU). In some instances, the ASIC may be configured to correct the detected CE and to transmit the requested data to the requesting entity.

At step 108, the temporal nature of the CE may be determined. In some instances, the ASIC may be configured to analyze the detected CE to determine the temporal characteristic of the detected CE. The temporal characterization of the CE may be used for flagging faulty hardware. Specifically, intermittent CEs and permanent CEs may indicate damaged hardware. This aspect of the disclosed technique or mechanism may allow for early detection of hardware that is on the path to being damaged (e.g., detected intermittent CEs) and damaged hardware (e.g., detected permanent CEs).

A retry mechanism may be invoked and may repeat and/or resend the same read transaction that initiated the process in step 101 a predetermined number of times. The predetermined number of times may include multiple times (e.g., more than one time and typically between 4 and 8 times), and may be configurable. In such instances, the data read from the memory address as a result of the repeated read transactions might not be transmitted to the requestor (e.g., the CPU that initiated the read transactions). The data returned as a result of the repeated read transactions may indicate whether the detected CE is a transient, an intermittent, or a permanent error.

If the CE is determined to be transient, no further action may be required. If the CE is repeatable, but does not occur on every re-read, the CE may be determined to be intermittent. An intermittent CE may indicate that the CE may soon be permanent. If the CE is repeated with every re-read, the CE may be permanent, requiring mitigating action (e.g., remap memory or replace DRAM).

At step 109, it may be determined whether the detected CE is a transient CE. In some instances, the ASIC may be configured determine whether the detected CE is a transient error. A transient CE may indicate that the detected CE is expected during normal operations of the DRAM device and corresponding DIMM. The transient CE might not indicate damaged hardware within the DRAM device and/or corresponding DIMM. As such, further action might not be required upon determining that the detected CE is a transient error, and processing as to characterizing the potential fault terminates. In some instances, the ASIC may be configured to terminate the process of characterizing the temporal nature of the detected CE based on determining the detected CE is a transient error.

However, if, at step 109, it is determined that the detected CE is not a transient CE, then at step 110, it may be determined that the detected CE is one of an intermittent CE or a permanent CE. In some instances, the ASIC may be configured to determine that the detected CE is one of an intermittent error or permanent error based on determining that the detected CE is not a transient error. Based on determining if the detected CE is one of an intermittent CE or a permanent CE, processing as to characterizing the potential fault may proceed.

At step 111, the spatial characteristic of the detected intermittent or permanent CE may be determined. In some instances, the ASIC may be configured to analyze the detected CE to determine the spatial characteristic of the detected CE. Since a DRAM device fault may affect a particular structure within a DRAM device, a single fault can potentially affect a large number of DRAM devices, locations, and memory addresses. The spatial characteristic of the CE may be used to determine a number of DRAM devices and/or memory addresses that may be affected by the intermittent CE or permanent CE. In particular, determining the spatial characteristic of the detected intermittent or permanent CE may include determining a number of DQs affected by the CE (e.g., 1 DQ, 4 DQs). The number of affected DQs may be indicated in ECC decoding logic. The ECC coding may be adapted (e.g., by the DRAM device memory controller) by making use of the erasure code capability, which may use the described RS scheme to indicate a number of available ECC symbols, by taking into account the known location of an intermittent or permanent error. For instance, if the error is a permanent error on 2 DQs, a new decoding scheme may take into account the erasure of these specific DQs (e.g., using 2 ECC symbols and/or bits).

Determining the spatial characteristics of the detected CE may include determining the location of the fault of the error. One approach to doing so is to probe memory addresses spatially related to an errored memory address. For instance, a read request may impact a given number of addresses that share some underlying structure in the memory (e.g., a group of memory cells whose access is controlled by a common piece of circuitry). If a read request to one of these addresses results in an ECC error, other related addresses may be accessed and checked to determine whether there are multiple address errors.

At step 112, it may be determined that the intermittent or permanent CE affects a single DQ (e.g., 1 DQ). In some instances, the ASIC may be configured to determine, based on the analysis in step 111, that the detected CE affects 1 DQ. A number of DQs affected by the detected CE may influence the corrective action taken to remedy the CE. In general, the corrective action taken may include a memory controller signaling the CPU, or more generally the host system of the affected addresses, memory regions, or DQs, with the type of error (UE or CE), and its temporal and spatial characteristics. Other actions may include mitigating against the error.

For example, if the error is associated with one or more memory addresses, those addresses can be remapped to other addresses or areas in memory. In some instances, the ASIC may be configured to remap the memory addresses associated with the detected CE. The remapping may include making use of the LLC by remapping the affected memory locations to the LLC. This would result in the data stored in those address locations to be stored in the LLC, such that read requests may be diverted to the LLC instead of the affected memory locations. This remapping may be handled entirely within the memory controller without the CPU or host being notified of the errors or hardware faults. The errored address locations may be flagged, and the CPU/host may be notified of the nature of the error so that the underlying issue may be dealt with proactively as part of a scheduled maintenance. In this regard, note that error and fault detection mechanisms of the disclosed technology may operate at the hardware and/or microarchitectural level. Regardless of whether the error is flagged and reported, early error and fault detection may be used to extend the life of the memory device and memory module.

More generally, the transient nature of an error may be used to take corrective action that extends the life of a memory device and the DIMM. Those actions include using the decoding scheme to correct intermittent or permanent errors or not using regions in memory that exhibit such errors. Alternatively, when a UE is determined to be intermittent or permanent, the DRAM device associated with the UE may be retired (e.g., not further used) or replaced. These mitigation measures may avoid the need to replace the DIMM altogether, which is generally less efficient, e.g., potential down time and/or reduced memory capacity for processing workloads, while also being more expensive. Aspects of the disclosed technology may enable a number of DRAM device errors to be caught at an early stage when they still can be corrected. In addition, using the ECC encoding adaptation, the ECC capability can be improved by using erasure code capabilities.

If, at step 112, it is determined that the intermittent or permanent CE affects a single DQ (e.g., 1 DQ), then, at step 113, the read transaction may be re-executed in a different column and a different row than the column and row where the initial read transaction was executed (and/or where previous read transactions were executed). In some instances, the ASIC may be configured to execute additional read transaction in different locations based on determining the detected CE affects 1 DQ. Such operations (probing other columns and rows using the read transaction) and other operations discussed below (e.g., steps 114 to 129) in effect provide a technique for determining a fault profile.

At step 114, it may be determined whether an error (e.g., the intermittent or permanent CE) was detected as a result of re-executing the read transaction in a different column and a different row than the column and row where the initial read transaction was executed. In some instances, the ASIC may be configured to determine whether an error, such as the detected CE, was detected as a result of the re-executed read transaction.

If, at step 114, an error was detected (e.g., the intermittent or permanent CE), then, at step 115, the single DQ intermittent or permanent CE may be corrected using the ECC symbols stored in a different DRAM device on the DIMM. In some instances, the ASIC may be configured to correct the detected CE based on determining an error was detected. Where this is done, the process herein is said to correct the CE using erasure code capability. Based on determining the detected CE is one of an intermittent or permanent error and based on the detected CE affecting a single DQ, the described process may use the result of the re-executed read transaction to identify the reach or breadth of the CE. Based on determining that the detected CE affects columns and rows that are different from the column and row where the first read transaction was executed, it may be determined that the impact of the CE reaches the single DQ and that using the erasure code capability may correct the CE. In some instances, the ASIC may be configured to implement the erasure code capability to correct the CE.

The erasure code capability may allow for the erasure of data that is written to a memory address associated with the single affected DQ of a DRAM device on the DIMM. In particular, an ECC symbol stored on the DIMM may be used to clear the data symbol within the memory address and to write a correct data symbol to the memory address, such that the corrected data symbols may be returned to the requesting system in subsequent executions of read transactions. The RS scheme may be updated (or a new (RS) scheme may be generated) upon the execution of the erasure code capability to reflect an updated number of ECC symbols stored on the DIMM.

The described process of characterizing the CE may terminate. In some instances, the ASIC may be configured to terminate the process of characterizing the detected CE based on correcting the detected CE.

However, if, at step 114, an error was not detected as a result of re-executing the read transaction in a different column and a different row than the column and row where the initial read transaction was executed, then, referring to FIG. 1B and at step 116, the read transaction may be re-executed in the same row as the initial read transaction but in a different column. In some instances, the ASIC may be configured to re-execute the read transaction in a different location based on determining an error was not detected.

At step 117, it may be determined whether an error (e.g., the intermittent or permanent CE) was detected as a result of re-executing the read transaction in a different column than where the initial read transaction was executed but in the same row as the initial read transaction. In some instances, the ASIC may be configured to determine whether an error, such as the detected CE, was detected as a result of re-executing the read transaction.

If, at step 117, an error is detected a result of re-executing the read transaction in a different column than where the initial read transaction was executed but in the same row as the initial read transaction, then, at step 118, the detected intermittent or permanent CE may be categorized as a partial row error. The partial row error may be corrected using at least one fast post package repair command (e.g., at least one sPPR command) and processing as to characterizing the spatial aspect of the CE may terminate. In some instances, the ASIC may be configured to determine that an error that is detected as a result of the re-executed read transaction may be a partial row error, to correct the error, and to terminate the process of characterizing the detected CE.

However, if, at step 117, an error was not detected as a result of re-executing the read transaction in a different column than where the initial read transaction was executed but in the same row as the initial read transaction, then, at step 119, the read transaction may be re-executed in the same column as the initial read transaction, but in a different row than where the initial read transaction was executed. In some instances, the ASIC may be configured to re-execute the read transaction in a different memory location.

At step 120, it may be determined whether an error was detected as a result of re-executing the read transaction in the same column as the initial read transaction, but in a different row than where the initial read transaction was executed. In some instances, the ASIC may be configured to determine whether an error, such as the detected CE, was detected as a result of the re-executed read transaction.

If, at step 120, an error is detected as a result of re-executing the read transaction in the same column as the initial read transaction, but in a different row than where the initial read transaction was executed, then, at step 121, the detected intermittent or permanent CE may be categorized as a column error. The column error may be corrected using the ECC symbols stored in a different DRAM device on the DIMM. Where this is done, the process herein is said to correct the CE using erasure code capability. Processing as to characterizing the spatial aspect of the CE may terminate. In some instances, the ASIC may be configured to determine that an error detected as a result of the re-executed read transaction may be a column error, to correct the column error, and to terminate the process of characterizing the detected CE.

Alternatively, if, at step 120, an error is not detected as a result of re-executing the read transaction in the same column as the initial read transaction, but in a different row than where the initial read transaction was executed, then, at step 122, the previously detected intermittent or permanent CE may be categorized as a rare and/or unknown error. In such instances, the rare and/or unknown error may be flagged for manual inspection. Processing as to characterizing the spatial aspect of the CE may terminate. In some instances, the ASIC may be configured to flag the detected CE as a rare or unknown error based on determining that no errors were detected as a result of re-executing the read transaction.

Returning to FIG. 1A, if, at step 112, it is determined that the intermittent or permanent CE affects more than a single DQ (e.g., 4 DQs), then, referring to FIG. 1C and at step 123, the read transaction may be re-executed in a different bank and a different row than the bank and row where the initial read transaction was executed. In some instances, the ASIC may be configured to re-execute the read transaction in a different memory location based on determining the detected CE affects more than one DQ.

At step 124, it may be determined whether an error was detected as a result of re-executing the read transaction in a different bank and a different row than the bank and row where the initial read transaction was executed. In some instances, the ASIC may be configured to determine whether an error was detected as a result of re-executing the read transaction in a different memory location.

If, at step 124, an error is detected as a result of re-executing the read transaction in a different bank and a different row than the bank and row where the initial read transaction was executed, then, at step 125, the detected intermittent or permanent CE may be categorized as a full device error. The full device error may be corrected using the ECC symbols stored in a different DRAM device on the DIMM. Where this is done, the process herein is said to correct the CE using erasure code capability. Processing as to characterizing the spatial aspect of the CE may terminate. In some instances, the ASIC may be configured to determine that an error that is detected as a result of re-executing the read transaction at a different memory location is a full device error, to correct the full device error, and to terminate the process of characterizing the detected CE.

However, if, at step 124, an error was not detected, then, at step 126, the read transaction may be re-executed in the same bank as the initial read transaction but in a different row. In some instances, the ASIC may be configured to re-execute the read transaction based on determining an error, such as the detected CE, was not detected.

At step 127, it may be determined whether an error was detected as a result of re-executing the read transaction in the same bank as the initial read transaction but in a different row. In some instances, the ASIC may be configured to determine whether an error was detected as a result of re-executing the read transaction.

If, at step 127, an error is detected as a result of re-executing the read transaction in the same bank as the initial read transaction but in a different row, then, at step 128, the previously detected intermittent or permanent CE may be categorized as a bank error. The bank error may be corrected using the ECC symbols stored in a different DRAM device on the DIMM. Where this is done, the process herein is said to correct the CE using erasure code capability. Processing as to characterizing the spatial aspect of the CE may terminate. In some instances, the ASIC may be configured to determine that an error that is detected as a result of re-executing the read transaction at a different memory location may be a bank error, to correct the bank error, and to terminate the process of characterizing the detected CE.

Alternatively, if, at step 127, an error is not detected as a result of re-executing the read transaction in the same bank as the initial read transaction but in a different row, then, at step 129, the previously detected intermittent or permanent CE may be categorized as a raw error. The raw error may be corrected using at least one fast post package repair command (e.g., at least one sPPR command) and processing as to characterizing the spatial aspect of the CE may terminate. In some instances, the ASIC may be configured to determine that if no error is detected a result of re-executing the read transaction, then the previously detected CE is a raw error. In some instances, the ASIC may be configured to correct the raw error and to terminate the process of characterizing the detected CE.

Figure 2:
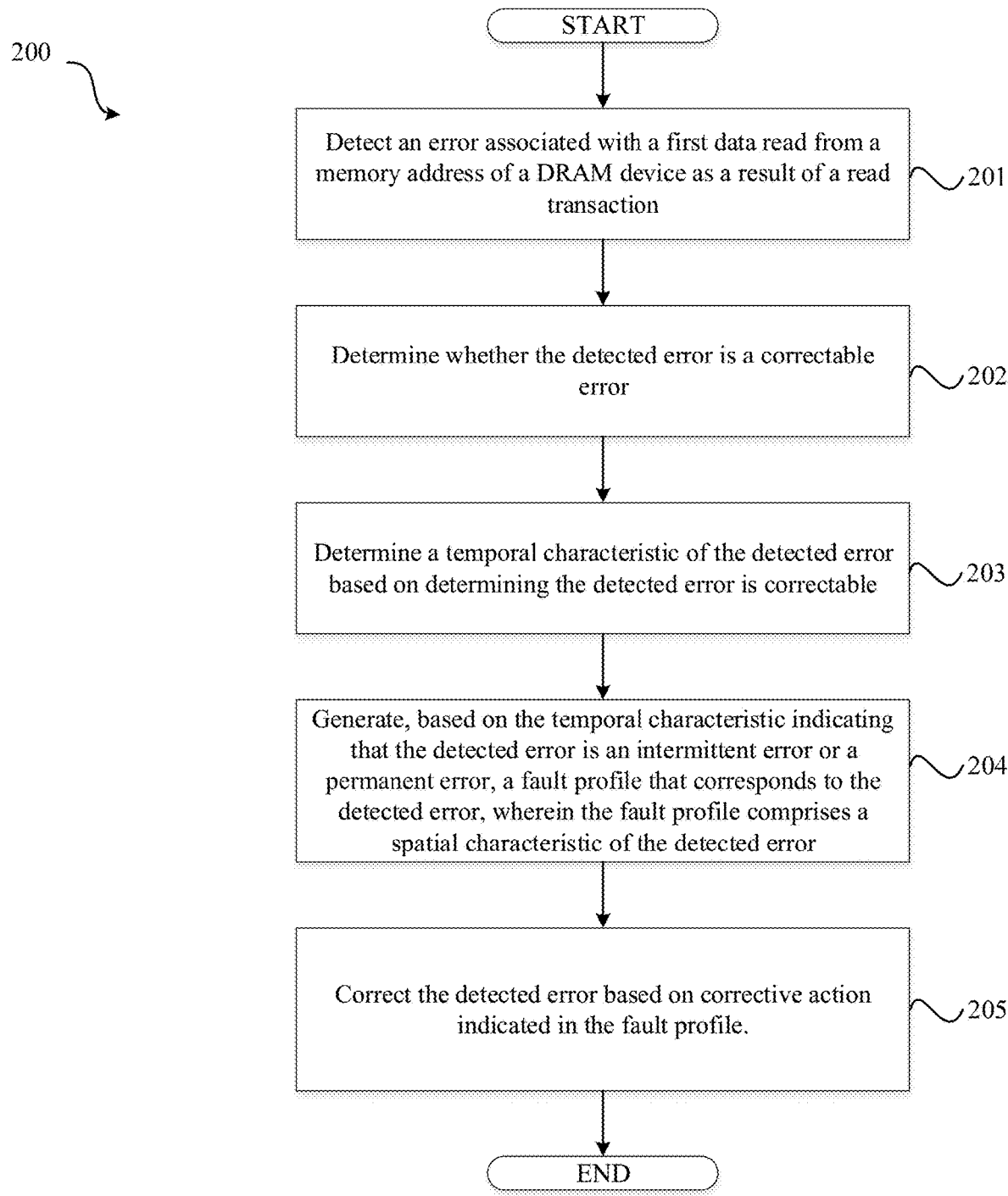
FIG. 2 illustrates an example process for extending DIMM lifespans based on fault characterization and optimized corrective action, in accordance with an aspect of the disclosed technology.

FIG. 2 illustrates an example process of extending DIMM lifespans based on fault characterization and optimized corrective action, in accordance with an aspect of the disclosed technology. The steps described herein may be performed by one or more hardware components that may be added to current memory controllers, DRAM devices, or DIMMs (e.g., application specific integration circuits (ASICs)). The steps described herein are presented in the current order by way of example and the order of steps are not meant to be limiting.

Referring to example process 200 illustrated in FIG. 2, at step 201, an ASIC may execute a first read transaction and may detect, as a result of the first read transaction, an error.

At step 202, the ASIC may determine whether the detected error is a CE or an UE. A CE may be detected and corrected using Error Correction Code (ECC) symbols, e.g., Reed-Solomon (RS) codes, array codes, or the like, stored within a different DRAM device from the DRAM device used to store data symbols. Alternatively, a UE may be detected, but might not be corrected.

At step 203, the ASIC may determine the detected error is a CE and, based on determining the detected error is a CE, the ASIC may determine a temporal characteristic of the detected CE. The temporal characteristic of an error may indicate that the error is one of a transient, intermittent, or permanent error. A transient error may be a one-off error that is expected during normal (or expected) operations of a DRAM device, where transient errors may include a hardware glitch, static shock, poor hardware settings, poor hardware quality, or the like. Expected operations of the DRAM device may include read transactions, write transactions, transmitting data through a data bus, searching for data in a DRAM device memory location, or the like. Transient errors typically do not indicate hardware damage. Transient errors may occur more infrequently (e.g., once) within some predetermined time period or predetermined number of memory transactions than intermittent errors (e.g., multiple times). An intermittent error may repeatedly occur in the same location (e.g., a particular DRAM memory address). A permanent error may occur in the same location (e.g., the particular DRAM memory address) each time the location is accessed.

At step 204, the ASIC may determine that the detected CE is one of an intermittent error or a permanent error, and may execute additional read transactions and analyze the outcome of the re-executed read transactions to generate a fault profile of the detected CE. The fault profile may include a spatial characteristic of the detected CE. The spatial characteristic of the detected CE may identify a number of memory locations or a number of DQs associated with the DRAM device that may be affected by the detected CE. Each spatial characteristic may be associated with a corrective action.

Each DRAM device on the DIMM is comprised of independently-controlled banks (e.g., data banks). The banks share the DQs of the DRAM device and each bank is comprised of a subarray of data (e.g., a DRAM memory matrix). Each subarray comprises rows and columns, which provide memory addresses to which the CPU may write data and from which the CPU may read data. The columns and rows of the subarray may include data that is stored in memory locations of the DRAM device.

The most common spatial characteristics of an error that affects a single DQ may indicate that the error is one of a single column, a partial row error, or a single DQ error. The single column error may affect a single column, but may span multiple rows. The partial row error may affect between 2 and 128 columns in a single row. A single pin error may occur across every rank on the single DQ.

The most common spatial characteristics of an error that affects more than one DQ may indicate that the error is one of a single row error, a single bank error, or a full device error. The single row error may affect all or most of the columns in a row. The single bank error may affect all or most of the rows in a bank. The full device error may affect between 9 and 16 banks in a DRAM device.

At step 205, the ASIC may correct the detected CE based on the fault profile generated for the detected CE. In particular, the ASIC may identify the corrective action that corresponds to the spatial characteristic of the detected CE, and may use the identified corrective action to correct the CE.

Figure 3:
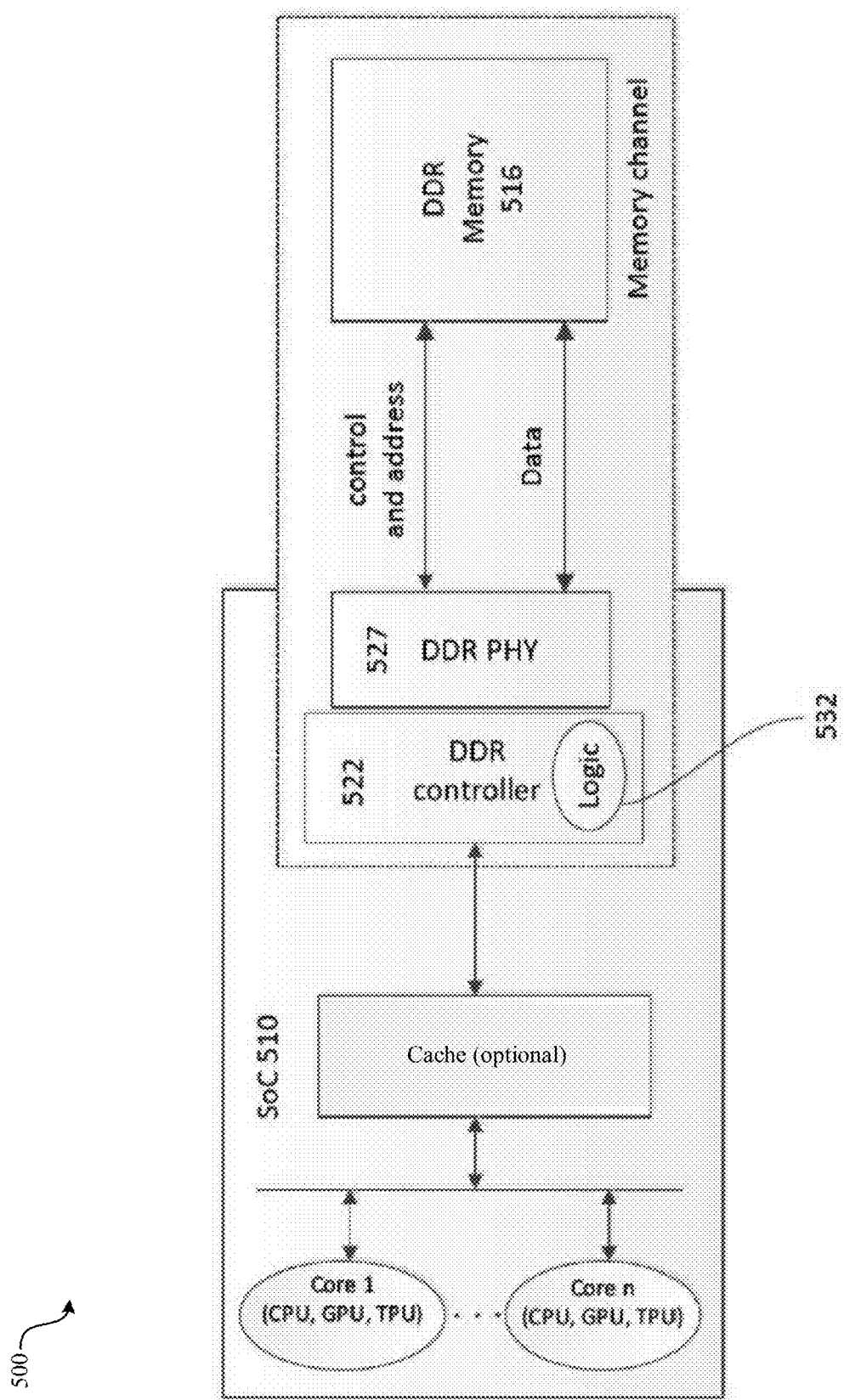
FIG. 3 illustrates an example system or apparatus for extending DIMM lifespans based on fault characterization and optimized corrective action, in accordance with an aspect of the disclosed technology.

FIG. 3 illustrates a system or apparatus 500 for extending DIMM lifespans based on fault characterization and optimized corrective action, in accordance with an aspect of the disclosed technology. In this example, the system 500 includes a system on a chip (SoC) 510 communicatively coupled to a DDR memory 516. DDR memory 516 is shown as one block, but it should be understood to also include multiple DRAM devices or one or more DIMMs. The SoC 510 includes a DDR controller 522 and DDR physical interface 527, through which command and address information and data may be transferred between the SoC 510 and DDR memory 516.

The DDR controller 522 includes logic 532 that implements the methods or processes discussed herein, e.g., processes described in relation to FIG. 1A-1C. Specifically, the SoC 510, as part of processing information (e.g., using processing elements forming its one or more cores), may need data to be recalled from DDR memory 516. Logic 532, in the form of one or more instructions, may be configured to implement the process flows of FIG. 1A-1C to decode data being read from DDR memory 516 and determine the temporal and spatial characteristics of detected errors as discussed above. In an example implementation, the temporal and spatial determination logic and adapted decoder can be implemented in hardware logic within DDR controller logic 532.

The system of FIG. 3 may be used in one or more larger systems, such as a server, host, smartphone, personal computer, or, more generally, any electronic device that makes use of a DRAM. As indicated above, DRAM plays an important role in cloud computing systems. In addition, as the size of the DRAMs continues to increase in such systems, the need for schemes that lengthen the life or memory devices or modules in accordance with the disclosed technology mitigates against unnecessary expense and disruption in operating the network. As such, the disclosed technology may be implemented in servers or host machines such as those shown in cloud computing system 800 of FIG. 4.

Figure 4:
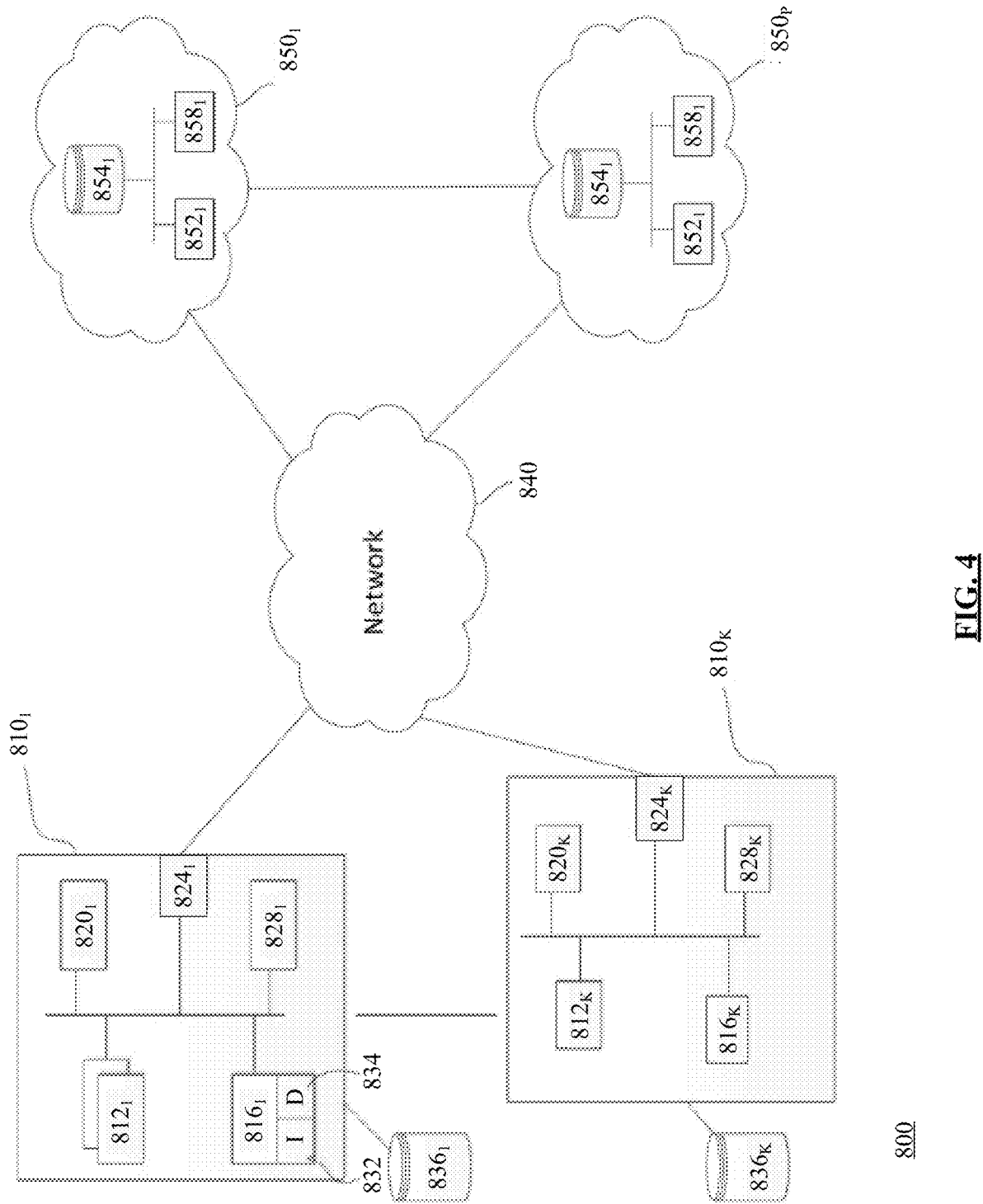
FIG. 4 illustrates an example system for extending DIMM lifespans based on fault characterization and optimized corrective action, in accordance with an aspect of the disclosed technology.

FIG. 4 illustrates a system for extending DIMM lifespans based on fault characterization and optimized corrective action, in accordance with an aspect of the disclosed technology. System 800 includes one or more computing devices 810, which may comprise computing devices $810_1$ through $810_K$, storage 836, a network 840 and one or more cloud computing systems 850, which may comprise cloud computing systems $850_1$ through $850_P$. Computing devices 810 may comprise computing devices located at a customer location that makes use of cloud computing services such as Infrastructure as a Service (IaaS), Platform as a Service (PaaS), and/or Software as a Service (SaaS). For example, if a computing device 810 is located at a business enterprise, computing device 810 may use cloud systems 850 as a service that provides software applications (e.g., accounting, word processing, inventory tracking, etc., applications) to computing devices 810 used in operating enterprise systems. In addition, computing device 810 may access cloud computing systems 850 as part of its operations that employ machine learning, or more generally artificial intelligence technology, to train applications that support its business enterprise. For example, computing device 810 may comprise a customer computer or server in a bank or credit card issuer that accumulates data relating to credit card use by its card holders and supplies the data to a cloud platform provider, who then processes that data to detect use patterns that may be used to update a fraud detection model or system, which may then notify the card holder of suspicious or unusual activity with respect to the card holder's credit. Other customers may include social media platform providers, government agencies, or any other business that uses machine learning as part of its operations.

As shown in FIG. 4, each of computing devices 810 may include one or more processors 812 (e.g., processors $812_1$ and $812_K$), memory 816 (e.g., memories $816_1$ and $816_K$) storing data 834 and instructions 832, display 820 (e.g., displays $820_1$ and $820_K$), communication interface 824 (e.g., communication interfaces $824_1$ and $824_K$), and input system 828 (e.g., input systems $828_1$ and $828_K$). The processors 812 and memories 816 may be communicatively coupled as shown in FIG. 4, and include memory controllers that implement the logic block shown in FIG. 4. Computing device 810 may also be coupled or connected to storage 836 (e.g., storages $836_1$ and $836_K$), which may comprise local or remote storage, e.g., on a Storage Area Network (SAN), that stores data accumulated as part of a customer's operation. Computing device 810 may comprise a standalone computer (e.g., desktop or laptop) or a server associated with a customer. A given customer may also implement as part of its business multiple computing devices as servers. Memory 816 stores information accessible by the one or more processors 812, including instructions 832 and data 834 that may be executed or otherwise used by the processor(s) 812. The memory 816 may be of any type capable of storing information accessible by the processor, including a computing device-readable medium, or other medium that stores data that may be read with the aid of an electronic device, such as a hard drive, memory card, ROM, RAM, DVD, or other optical disks, as well as other write-capable and read-only memories. Systems and methods may include different combinations of the foregoing, whereby different portions of the instructions and data are stored on different types of media.

The instructions 832 may be any set of instructions to be executed directly (such as machine code) or indirectly (such as scripts) by the processor 812. For example, the instructions may be stored as computing device code on the computing device-readable medium. In that regard, the terms "instructions" and "programs" may be used interchangeably herein. The instructions may be stored in object code format for direct processing by the processor, or in any other computing device language, including scripts or collections of independent source code modules that are interpreted on demand or compiled in advance. Processes, functions, methods, and routines of the instructions are explained in more detail below.

The data 834 may be retrieved, stored, or modified by processor 812 in accordance with the instructions 832. As an example, data 834 associated with memory 816 may comprise data used in supporting services for one or more client devices, applications, etc. Such data may include data to support hosting web-based applications, file share services, communication services, gaming, sharing video or audio files, or any other network-based services.

The one or more processors 812 may be any conventional processor, such as commercially available CPUs. Alternatively, the one or more processors may be a dedicated device such as an FPGA, ASIC, or other hardware-based processor. Although FIG. 4 functionally illustrates the processor, memory, and other elements of computing device 810 as being within the same block, it will be understood by those of ordinary skill in the art that the processor, computing device, or memory may actually include multiple processors, computing devices, or memories that may or may not be located or stored within the same physical housing. In one example, one or more computing devices 810 may include one or more server computing devices having a plurality of computing devices (e.g., a load-balanced server farm) that exchange information with different nodes of a network for the purpose of receiving, processing, and transmitting the data to and from other computing devices as part of customer's business operation.

Computing device 810 may also include a display 820 (e.g., a monitor having a screen, a touch-screen, a projector, a television, or other device that is operable to display information) that provides a user interface that allows for controlling the computing device 810. Such control may include, for example, using a computing device to cause data to be uploaded through input system 828 to cloud system 850 for processing, causing accumulation of data on storage 836, or more generally, managing different aspects of a customer's computing system. While input system 828 may be used to upload data, e.g., a USB port, computing system 800 may also include a mouse, keyboard, touchscreen, or microphone that can be used to receive commands and/or data.

The network 840 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc., and various combinations of the foregoing. Such communication may be facilitated by any device capable of transmitting data to and from other computing devices, such as modems and wireless interfaces. Computing device 810 interfaces with network 840 through communication interface 824, which may include the hardware, drivers, and software necessary to support a given communications protocol.

Cloud computing systems 850 may comprise one or more data centers that may be linked via high-speed communications or computing networks. A given data center within system 850 may comprise dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent that a given cloud computing system includes more than one data center, those data centers may be at different geographic locations within relatively close proximity to each other, chosen to deliver services in a timely and economically efficient manner, as well as provide redundancy and maintain high availability. Similarly, different cloud computing systems are typically provided at different geographic locations.

As shown in FIG. 4, computing system 850 may be illustrated as comprising infrastructure 852 (e.g., infrastructure $852_1$), storage 854 (e.g., storage $854_1$) and computer system 858 (e.g., computer system $858_1$). Infrastructure 852, storage 854 and computer system 858 may comprise a data center within a cloud computing system 850. Infrastructure 852 may comprise servers, switches, physical links (e.g., fiber), and other equipment used to interconnect servers within a data center with storage 854 and computer system 858. Storage 854 may comprise a disk or other storage device that is partitionable to provide physical or virtual storage to virtual machines running on processing devices within a data center. Storage 854 may be provided as a SAN within the data center hosting the virtual machines supported by storage 854 or in a different data center that does not share a physical location with the virtual machines it supports. Computer system 858 acts as supervisor or managing agent for jobs being processed by a given data center. In general, computer system 858 will contain the instructions necessary to, for example, manage the operations requested as part of a synchronous training operation on customer data. Computer system 858 may receive jobs, for example, as a result of input received via an application programming interface (API) from a customer.

Aspects of the disclosed technology may comprise a method, apparatus, system and/or non-transitory computer-readable medium for extending DIMM lifespans based on fault characterization and optimized corrective action, in accordance with aspects of the disclosed technology.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted

The invention claimed is:

1. A method for extending a lifespan of a dual in-line memory module (DIMM) comprising:
   detecting an error associated with a first data read from a memory address of a dynamic random access memory (DRAM) device as a result of a first read transaction, wherein the DRAM device comprises independently controlled data banks, wherein each data bank comprises a subarray of data, and wherein the subarray comprises rows and columns of data stored in the DRAM device;
   determining whether the detected error is a correctable error;
   based on determining the detected error is correctable, determining a temporal characteristic of the detected error;
   generating, based on the temporal characteristic indicating that the detected error is an intermittent error or a permanent error, a fault profile that corresponds to the detected error, wherein the fault profile comprises a spatial characteristic of the detected error,
   wherein the spatial characteristic indicates memory locations within the DIMM that are affected by the detected error, and indicates a number of data pins (DQs) within the DRAM device that are affected by the detected error, wherein based on determining the detected error affects a single data pin, re-executing the first read transaction in one of:
      a different column and a different row than a column and row where the first read transaction occurred,
      the different column and the row where the first read transaction occurred, or
      the different row and the column where the first read transaction occurred, and
   wherein the spatial characteristic corresponds to corrective action that is used to correct the detected error; and
   correcting the detected error based on the corrective action indicated in the fault profile.

2. The method of claim 1, wherein the determining whether the detected error is the correctable error is based on determining a number of detected errors is equal to or less than a number of error correction code (ECC) symbols stored in the DRAM device.

3. The method of claim 1, further comprising determining the detected error is an uncorrectable error based on a number of detected errors exceeding a number of ECC symbols stored in the DRAM device.

4. The method of claim 1, wherein the temporal characteristic of the detected error indicates that the detected error is a transient error, the intermittent error, or the permanent error, and wherein:
   the transient error occurs during expected operations of the DRAM device,
   the intermittent error occurs in a specific DRAM device memory location, and
   the permanent error occurs in the specific DRAM device memory location every time the specific DRAM device memory is accessed.

5. The method of claim 1, wherein determining the spatial characteristic of the detected error is based on determining that the detected error is the intermittent error or the permanent error.

6. The method of claim 1, further comprising, based on determining the detected error occurs in the different column and the different row than the column and row where the first read transaction occurred, identifying the detected error as a single data pin error and correcting the single data pin error using ECC symbols stored in the DRAM device.

7. The method of claim 1, further comprising, based on determining the detected error occurs in the different column and the row where the first read transaction occurred, identifying the detected error as a partial row error and correcting the partial row error using at least one fast post package repair (sPPR) command.

8. The method of claim 1, further comprising, based on determining the detected error occurs in the different row and the column where the first read transaction occurred, identifying the detected error as a column error and correcting the column error using ECC symbols stored in the DRAM device.

9. The method of claim 1, wherein generating the fault profile further comprises, based on determining the detected error is one of the intermittent error or the permanent error and based on determining the detected error affects more than one data pin (DQ), re-executing the transaction in one of:
   a different bank and a different row than a bank and row where the first read transaction occurred, or
   the different row and the bank where the first read transaction occurred.

10. The method of claim 9, further comprising, based on determining the detected error occurs in the different bank and the different row than the bank and row where the first read transaction occurred, identifying the detected error as a full device error and correcting the full device error using erasure code.

11. The method of claim 9, further comprising, based on determining the detected error occurs in the different row and the bank where the first read transaction occurred, identifying the detected error as a bank error and correcting the bank error using erasure code.

12. The method of claim 9, further comprising, based on determining the detected error occurs elsewhere, identifying the detected error as a raw error and correcting the raw error using at least one fast post package repair (sPPR) command.

13. An apparatus comprising:
   an interface for communicating with one or more memory devices;
   a memory controller, the memory controller having logic that causes the memory controller to:
      detect an error associated with a first data read from a memory address of a dynamic random access memory (DRAM) device as a result of a first read transaction, wherein the DRAM device comprises independently controlled data banks, wherein each data bank comprises a subarray of data, and wherein the subarray comprises rows and columns of data stored in the DRAM device;
      determine whether the error detected as a result of the first read transaction is a correctable error;
      based on determining the error detected as a result of the first read transaction is correctable, determine temporal characteristics of the detected error and spatial characteristics of the detected error; and
      correct the detected error based on the spatial characteristics of the detected error,
      wherein the logic further causes the memory controller to, based on determining the detected error is an intermittent error or a permanent error and based on determining the detected error affects a single data pin, re-execute the first read transaction in one of:
- a different column and a different row than a column and row where the first read transaction occurred,
- the different column and the row where the first read transaction occurred, or
- the different row and the column where the first read transaction occurred.

14. The apparatus of claim 13, wherein the logic comprises hardware logic, and wherein the logic is implemented in an application-specific integrated circuit (ASIC).

15. The apparatus of claim 13, wherein the temporal characteristic of the detected error indicates that the detected error is a transient error, an intermittent error, or a permanent error, and wherein:
- the transient error occurs during expected operations of the DRAM device,
- the intermittent error occurs in a specific DRAM device memory location, and
- the permanent error occurs in the specific DRAM device memory location every time the specific DRAM device memory is accessed.

16. The apparatus of claim 13, wherein the logic further causes the memory controller to, based on determining the detected error occurs in the different column and the different row than the column and row where the first read transaction occurred, identify the detected error as a single data pin error and correcting the single data pin error using ECC symbols stored in the DRAM device.

17. The apparatus of claim 13, wherein the logic further causes the memory controller to, based on determining the detected error occurs in the different column and the row where the first read transaction occurred, identify the detected error as a partial row error and correcting the partial row error using at least one fast post package repair (sPPR) command.

18. The apparatus of claim 13, wherein the logic further causes the memory controller to, based on determining the detected error occurs in the different row and the column where the first read transaction occurred, identify the detected error as a column error and correcting the column error using ECC symbols stored in the DRAM device.

19. The apparatus of claim 13, wherein the logic further causes the memory controller to, based on determining the detected error is an intermittent error or a permanent error and based on determining the detected error affects more than one data pin (DQ), re-execute the transaction in one of:
- a different bank and a different row than the bank and row where the first read transaction occurred, or
- the different row and the bank where the first read transaction occurred.

20. The apparatus of claim 19, wherein the logic further causes the memory controller to, based on determining the detected error occurs in the different bank and the different row than the bank and row where the first read transaction occurred, identify the detected error as a full device error and correcting the full device error using erasure code.

21. The apparatus of claim 19, wherein the logic further causes the memory controller to, based on determining the detected error occurs in the different row and the bank where the first read transaction occurred, identify the detected error as a bank error and correcting the bank error using erasure code.

22. The apparatus of claim 19, wherein the logic further causes the memory controller to, based on determining the detected error occurs elsewhere, identify the detected error as a raw error and correcting the raw error using at least one fast post package repair (sPPR) command.

23. A system comprising:
- a dual in-line memory module (DIMM) comprising a plurality of DRAM devices;
- a memory controller configured to communicate with the plurality of DRAM devices and having logic that causes the memory controller to:
  - detect an error associated with a first data read from a memory address of a dynamic random access memory (DRAM) device as a result of a first read transaction, wherein the DRAM device comprises independently controlled data banks, wherein each data bank comprises a subarray of data, and wherein the subarray comprises rows and columns of data stored in the DRAM device;
  - determine whether the error detected as a result of the first read transaction is a correctable error;
  - based on determining the error detected as a result of the first read transaction is correctable, determine temporal characteristics of the detected error and spatial characteristics of the detected error; and
  - correct the detected error based on the spatial characteristics of the detected error,
  - wherein the logic further causes the memory controller to, based on determining the detected error is an intermittent error or a permanent error and based on determining the detected error affects a single data pin, re-execute the read transaction in one of:
    - a different column and a different row than the column and row where the first read transaction occurred,
    - the different column and the row where the first read transaction occurred, or
    - the different row and the column where the first read transaction occurred.

* * * * *